US009961708B1

(12) United States Patent
Stair

(10) Patent No.: US 9,961,708 B1
(45) Date of Patent: May 1, 2018

(54) WIRELESS NETWORK CONNECTION MANAGEMENT

(71) Applicant: GreatCall, Inc., San Diego, CA (US)

(72) Inventor: Joel Stair, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days. days.

(21) Appl. No.: 15/342,952

(22) Filed: Nov. 3, 2016

(51) Int. Cl.
| | | |
|---|---|---|
| *H04W 4/00* | (2009.01) | |
| *H04W 76/02* | (2009.01) | |
| *H04W 8/00* | (2009.01) | |
| *H04W 4/14* | (2009.01) | |
| *H04W 84/04* | (2009.01) | |

(52) U.S. Cl.
CPC ......... *H04W 76/025* (2013.01); *H04W 4/008* (2013.01); *H04W 4/14* (2013.01); *H04W 8/005* (2013.01); *H04W 84/042* (2013.01)

(58) Field of Classification Search
CPC ..... H04W 76/025; H04W 4/008; H04W 4/14; H04W 8/005; H04W 84/042
See application file for complete search history.

(56) References Cited

U.S. PATENT DOCUMENTS

| | | | | |
|---|---|---|---|---|
| 9,497,580 B1* | 11/2016 | Cudak | ................... | H04W 4/008 |
| 2011/0081860 A1* | 4/2011 | Brown | ............... | H04N 1/00347 |
| | | | | 455/41.3 |
| 2011/0273625 A1* | 11/2011 | McMahon | ............ | G06F 21/445 |
| | | | | 348/734 |
| 2013/0185124 A1* | 7/2013 | Aaron | .................... | G07B 13/00 |
| | | | | 705/13 |
| 2014/0105394 A1* | 4/2014 | Abildgren | ............. | G06F 21/606 |
| | | | | 380/255 |
| 2015/0026365 A1* | 1/2015 | Chandler | .................. | G06F 3/00 |
| | | | | 710/10 |
| 2015/0080030 A1* | 3/2015 | Moldavsky | ........... | H04W 4/025 |
| | | | | 455/456.3 |
| 2016/0232515 A1* | 8/2016 | Jhas | ....................... | G06Q 30/02 |

OTHER PUBLICATIONS

Laura; "Bluetooth Low Energy Introduction"; MbientLab.com; Jan. 16, 2014; retrieved from http://projects.mbientlab.com/bluetooth-low-energy-basics/.

* cited by examiner

*Primary Examiner* — Qun Shen
(74) *Attorney, Agent, or Firm* — Kilpatrick Townsend & Stockton LLP

(57) ABSTRACT

Among other features, a communications device includes a wide area communications transceiver and a local wireless communications transceiver. The device is configured to recognize, via the local wireless communications transceiver, the presence of one or more peripheral wireless devices available for transferring data to the communications device. The device transmits to a remote site a list of the one or more recognized peripheral devices, and receives from the remote site an instruction to establish communications with a particular one of the one or more recognized peripheral devices. The device establishes communications with the particular recognized peripheral device in response to the received instruction, for example by pairing.

21 Claims, 8 Drawing Sheets

WIRELESS NETWORK CONNECTION MANAGEMENT

BACKGROUND OF THE INVENTION

Portable electronic communication devices such as cellular telephones have become ubiquitous, and various kinds and models of devices have evolved to address specific needs. For example, "smart" phones often include touchscreen displays for displaying information to users and for accepting inputs from the users, and may include the capability to install application software to enhance the functions of the smart phone. Other more traditional phones may use an electromechanical keypad for entry of phone numbers to call and other information, and may use a display only for presenting information.

For some uses, specialized communication devices have been developed having greatly simplified user input interfaces. Some devices may lack any graphical display, and may include limited input capability, for example a single button for initiating a call to a previously-specified telephone number. While such a simplified user input interface is helpful to avoid mistakes and confusion on the part of the user of the device, the simplification comes at the cost of flexibility. For example, the device may have capabilities that are difficult or impossible to utilize using such a simplified input interface.

Many communication devices include short- or medium-range wireless transceivers for communicating with other devices in their immediate vicinity. For example, a cellular telephone may have, in addition to its cellular network transceiver, a Bluetooth® or other radio for local wireless communications. Local wireless communications may be used to connect to peripheral devices such as headphones, audio speakers, and the like. In other uses, a communication device may, once properly configured, be able to wirelessly connect to a sensor such as a heart rate monitor or other sensor, and relay information from the sensor to a remote monitoring station. However, configuring the local wireless communication channel may be difficult for some users, for example users whose communication devices have simplified user interfaces, or users who are unfamiliar with the steps required for the configuration.

BRIEF SUMMARY OF THE INVENTION

According to one aspect, a communications device comprises a wide area communications transceiver, a local wireless communications transceiver, a processor, and memory. The memory holds data and instructions. The instructions, when executed by the processor, cause the communications device to recognize, via the local wireless communications transceiver, the presence of one or more peripheral wireless devices available for transferring data to the communications device. The instructions further cause the device to transmit, to a remote site via the wide area communications transceiver, a list of the one or more recognized peripheral devices, and to receive, from the remote site via the wide area communications transceiver, an instruction to establish communications with a particular one of the one or more recognized peripheral devices. The instructions further cause the device to establish communications with the particular recognized peripheral device in response to the received instruction.

DETAILED DESCRIPTION OF THE INVENTION

The ensuing description provides preferred example embodiment(s) only, and is not intended to limit the scope, applicability or configuration of the disclosure. Rather, the ensuing description of the preferred example embodiment(s) will provide those skilled in the art with an enabling description for implementing a preferred example embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments. Furthermore, embodiments may be implemented by manual techniques, automatic techniques, or any combination thereof.

Figure 1:
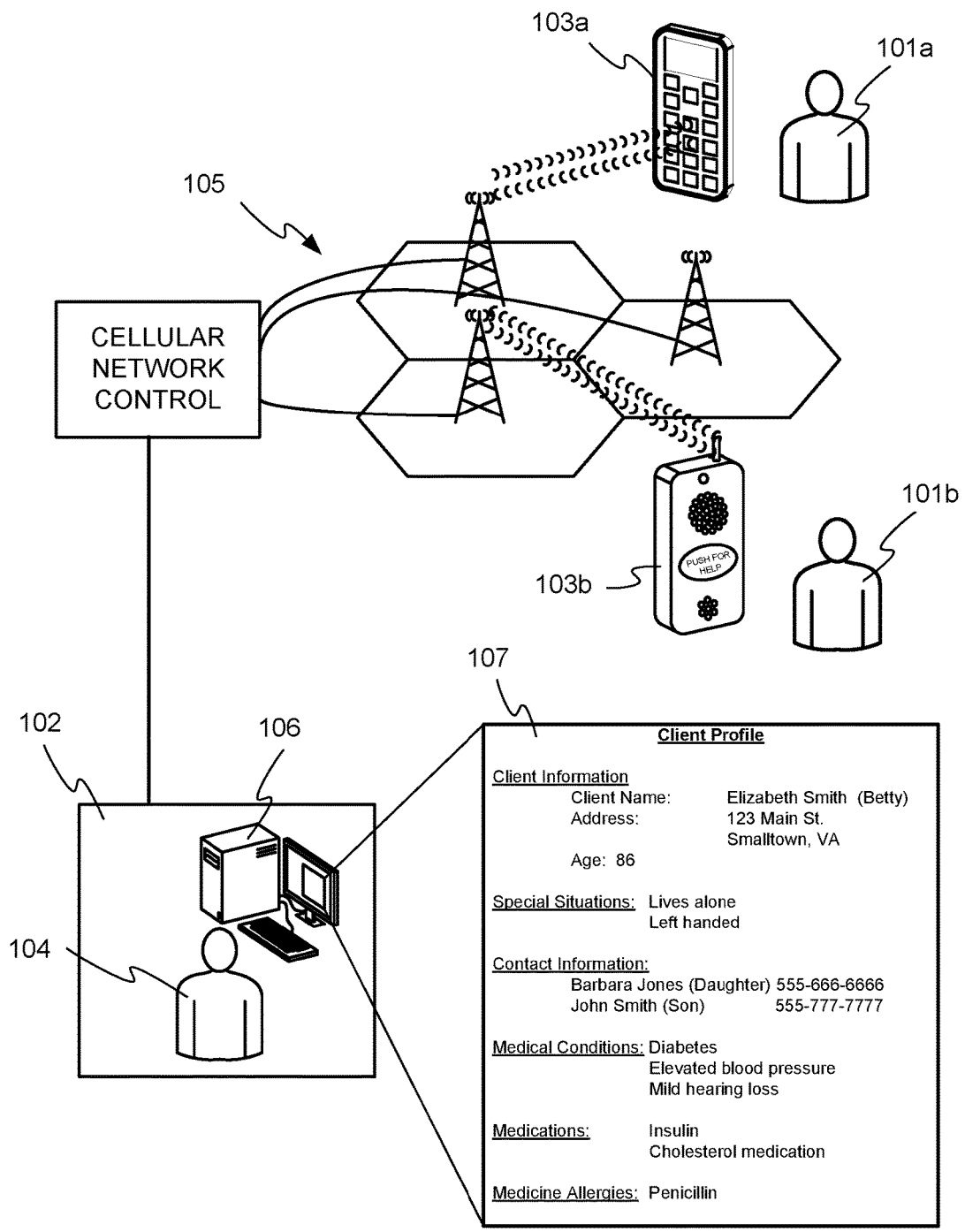
FIG. 1 illustrates the operation of a telephone-based assistance service with which embodiments of the invention may find utility.

Embodiments of the invention may find particular utility in conjunction with an assistance service, as depicted in FIG. 1. In the example arrangement of FIG. 1, clients 101a and 101b of a private response center (PRC) 102 use their portable electronic devices 103a and 103b to reach PRC 102. PRC 102 may be operated, for example, by a response service provider who offers personalized assistance to clients who subscribe to the service. In some embodiments, the response service provider may offer personal health management advice, concierge services, navigational assistance, technical support for telephones used in conjunction with the service, or other kinds of personalized services deliverable by telephone. PRC 102 may be staffed by customer service representatives 104 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. Although PRC 102 is shown as a staffed service, in other embodiments PRC 102 may also be a fully automated system, self-service website, mobile application, or similar.

In one example scenario, the service provider that operates PRC 102 may also be a cellular telephone service provider, and may offer a private assistance service as an adjunct to cellular telephone service. PRC 102 can be contacted through a phone number, speed dial or other shortcut, for example by activating a 5 and * key combination on a telephone, by activating an application on a smart phone, or by other methods. FIG. 1 illustrates contacting PRC 102 using cellular devices through cellular network 105, but clients of PRC 102 may reach PRC 102 by other means as well, for example via conventional wire line telephone, using a voice-over-Internet-protocol (VOIP), or any other suitable connection method that enables a user to reach PRC 102. PRC 102 may be reachable via multiple methods.

While embodiments of the invention are described primarily in the context of a private response center, the invention is not so limited and may be embodied in a public facility as well.

PRC 102 includes a computer system 106 that may be used for various functions. For example, information about calls from clients may be displayed to customer service representative 104. Computer system 106 may store personal information gathered from clients that may be helpful in rendering assistance to the clients. Computer system 106 may assist customer service representative 104 in the performance of his or her job, for example automating telephone dialing and the like. While computer system 106 is illustrated as a single computer, it will be recognized that the term "computer system" encompasses many different kinds of installations, including systems of multiple computers linked together. The multiple computers may be co-located or widely dispersed. In other embodiments, computer system 106 may be implemented using a mobile device, service, or application, or other Internet service.

Computer system 106 may also store a personal profile of each client. For example, upon enrollment in the service provided by PRC 102, a client may provide information about his or her medical conditions, medications, and other information that may assist PRC 102 in assisting the client. The client may also provide contact information for family members or other entities that can be contacted in the event of an emergency, or who are to be informed about the health and well-being of the client. An abbreviated example personal profile 107 is shown in FIG. 1. Upon receiving a call from a client of PRC 102, computer system 106 may display the client's personal profile to the customer service representative handling the call, so that the customer service representative can better assist the client, and can immediately identify contacts who may need to be notified of the call or included in a response to the call.

Figure 2A:
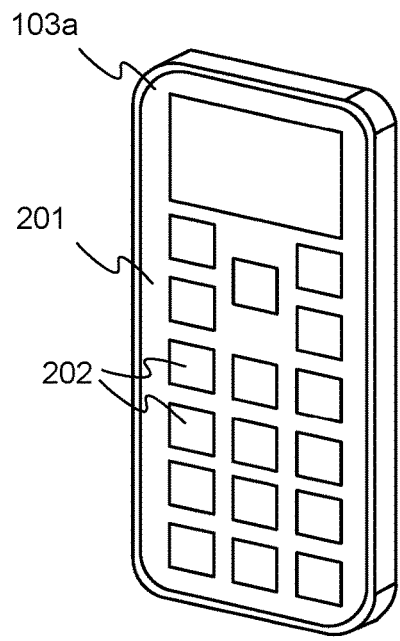
FIGS. 2A-2C illustrate communication devices usable in embodiments of the invention.

FIG. 2A illustrates example cellular telephone 103a in more detail. Cellular telephone 103a may be a so-called "smart phone" or other similar device such as a tablet computer. Smart phone 103a includes complete cellular telephone capability, but may perform many other functions as well, for example running application programs that provide a host of capabilities. A touchscreen 201 or other kind of display may be provided, on which a keypad 202 may be emulated. Cellular telephone 103a also includes a microphone and speaker (not shown) for use as a telephone. In some embodiments, a call to response center 102 may be initiated by activating a software application on telephone 103a, for example by actuating a control in the user interface shown on touchscreen 201.

Figure 2B:
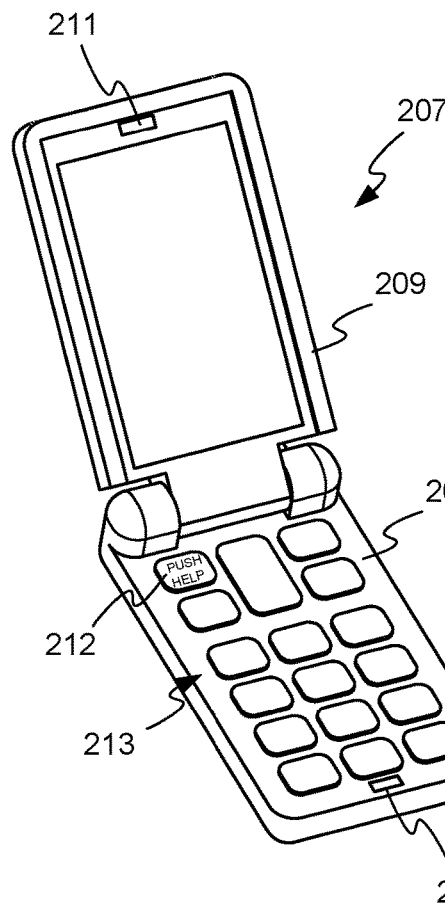

FIG. 2B illustrates another kind of mobile device 207 usable in embodiments of the invention. Device 207 is in the form of a "flip" phone, having a keypad portion 208 and a display portion 209 that swivel with respect to each other, so that the phone folds for storage and carrying, but unfolds for use. A microphone 210 and speaker 211 are conveniently positioned for telephone communication. A designated shortcut key 212 may be used to contact response center 102 directly, while keypad 213 enables calling other telephone numbers.

Figure 2C:
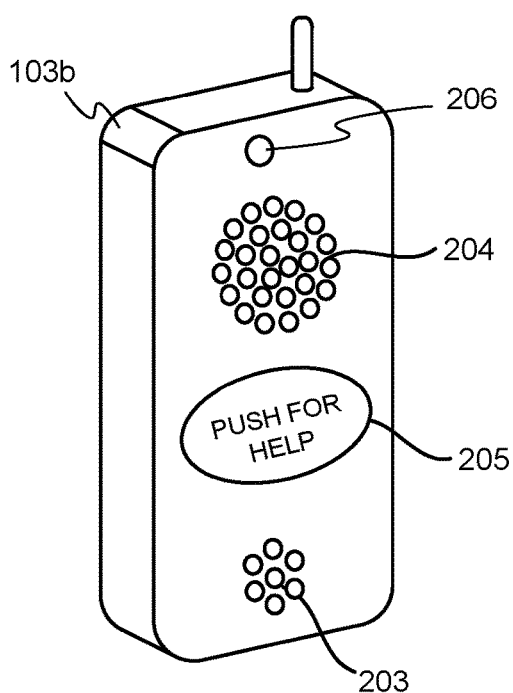

FIG. 2C illustrates simplified mobile communicator 103b in more detail. Simplified communicator 103b may be especially useful for some clients of response center 102. Example mobile communicator 103b may internally be a fully-featured cellular telephone, but has a simplified input interface comprising one button 205 for initiating a call directly to response center 102. Simplified communicator 103b may also be referred to as a "fob" or an "emergency communicator." For the purposes of this disclosure, the term "telephone" is intended to encompass mobile communicator 103b. A client of private response center 102 may wear simplified communicator 103b on his or her person, and can use it to contact private response center 102 whenever assistance is needed. For example, simplified communicator 103b may be configured to dial private response center 102 when button 205 is pressed. This greatly simplified input interface may be especially helpful to clients with impairments such as poor vision or coordination that make it difficult to operate a conventional cellular telephone that has many small keys. The single-button input interface assures that private response center 102 will be called without the client having to press a sequence of keys. In an event where help is needed, the client may be distraught or disoriented, and the simplified input interface increases the chance of the client reaching private response center 102. For the purpose of this disclosure, a user interface is "simplified" if it does not provide for the dialing of arbitrary telephone numbers.

Simplified communicator 103b further includes a microphone 203 and a speaker 204, enabling telephone or telephone-like communication. In some embodiments, simplified communicator 103b does not include a display, although one may be included on which messages can be shown to the user. In some embodiments, simplified communicator 103b may include an indicator light 206 or other visual indicator. Indicator light 206 may be used, for example, to indicate that the device is active, connected on a call, or the like.

Other embodiments of the invention may use other kinds of devices. For example, embodiments of the invention may use dedicated-purpose wireless devices as is described in more detail below.

Figure 3:
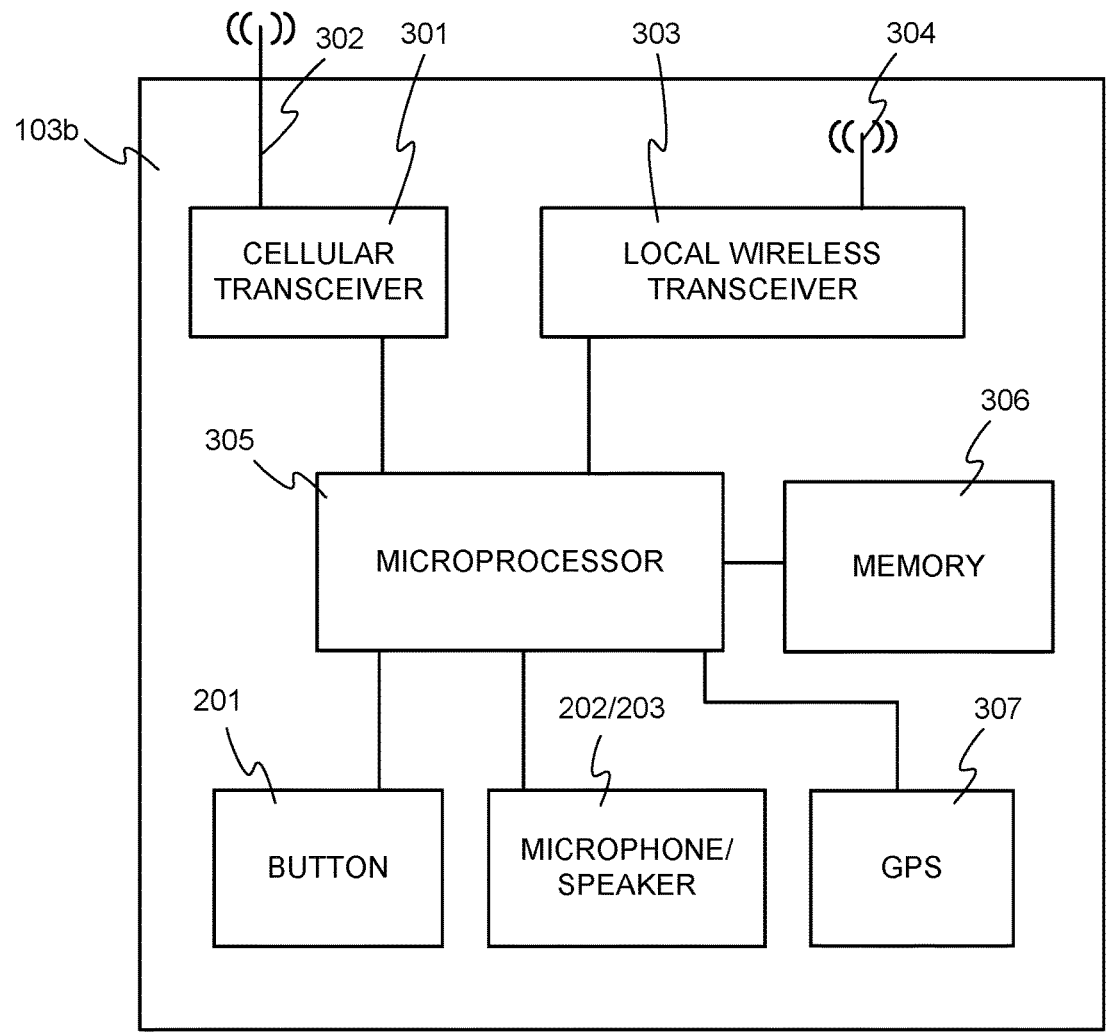
FIG. 3 illustrates a simplified schematic diagram of the communication device of FIG. 2C.

FIG. 3 illustrates a simplified schematic diagram of example electronic architecture of communications device 103b. Device 103b includes a cellular telephone transceiver 301 and antenna 302 for communicating via cellular network 105, for example. Cellular telephone transceiver 301 is an example of a wide area communication capability. Device 103b also includes a local wireless communication transceiver 303 and antenna 304. Local wireless communication transceiver 303 may be, for example, a Bluetooth® transceiver compatible with specifications promulgated by the Bluetooth SIG, Inc., of Kirkland, Wash., USA.

Bluetooth® enables devices to communicate wirelessly over distances of up to about 100 meters, depending on the power class of the Bluetooth® devices involved. A low-power version of Bluetooth®, called Bluetooth® LE or Bluetooth® Smart is available, and while capable of communication over similar distances, is targeted at applications involving devices only a few meters apart at most. Other kinds of communication protocols than Bluetooth® may be used in embodiments of the invention, for example Zig-Bee®, NFC™, Wi-Fi™, ANT™, Z-Wave®, or another standard or proprietary communication protocol. Device 103b may include multiple local wireless transceivers, for example transceivers of different types.

Example device 103b includes a microprocessor 305 that controls the operation of device 103b, under control of instructions stored in a memory 306. Memory 306 may include volatile memory, nonvolatile memory, or a combination of these, and may store user data, application programs, temporary variables, and a variety of other kinds of information.

As is described above, example device 103b includes button 205, speaker 204, and microphone 203. Device 103b may also include a global positioning system (GPS) receiver 307, for receiving signals from GPS satellites, enabling communication device 103b to accurately ascertain its geographical location when enough GPS satellites are "visible" to device 103b. Device 103b may use GPS information in a variety of ways, for example to transmit its location periodically or when requested to PRC 102, as part of a client monitoring service offered by the operator of PRC 102. More information about the operation and possible use of GPS information by a communication device can be found in U.S. Pat. No. 8,489,066 issued Jul. 16, 2013 and titled "Systems and Methods for Identifying Caller Locations", the entire disclosure of which is hereby incorporated by reference herein.

As is explained above, the user interface of communication device 103b is intentionally simplified, in order to address a particular client need. Communication device 103b includes internal circuitry that could be used for a variety of other functions, but the simplified user input interface does not provide any mechanism for the user to access any other functions.

Figure 4:
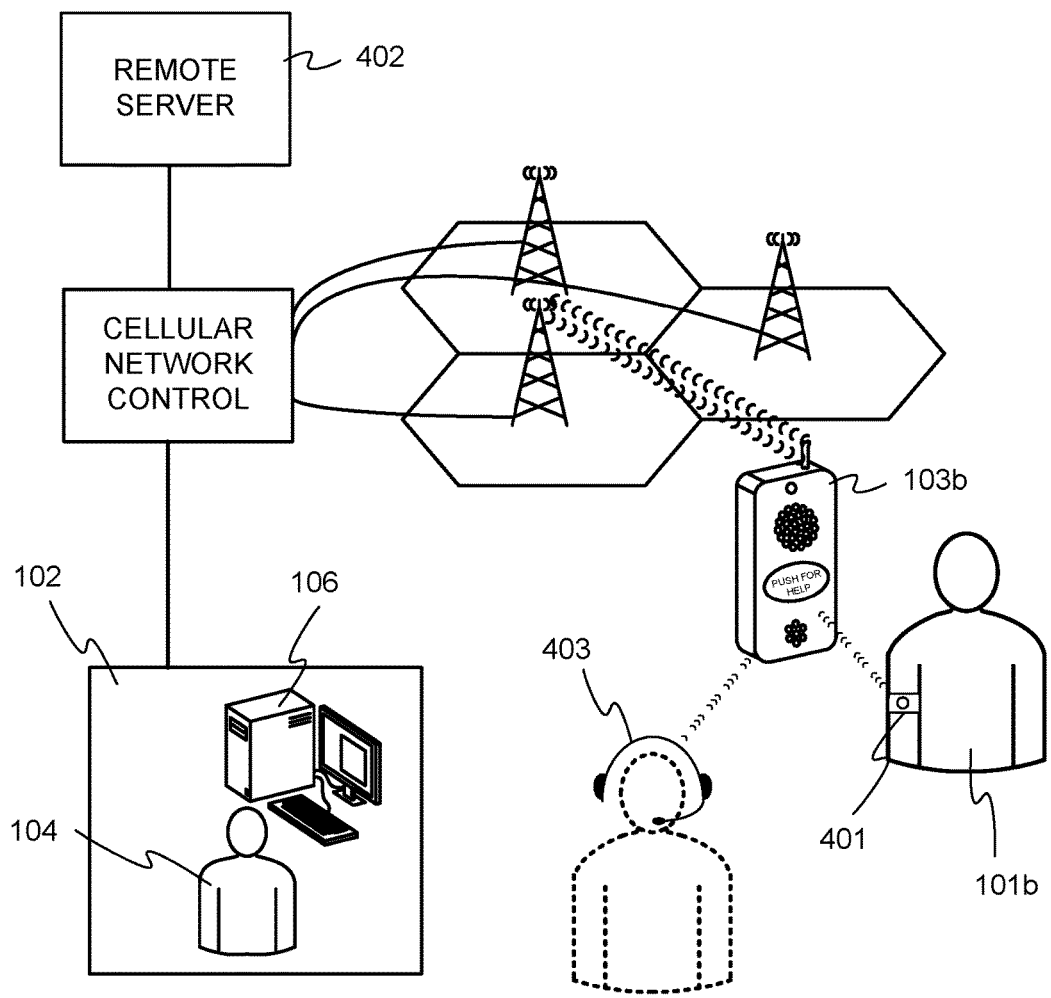
FIG. 4 illustrates another example system in which embodiments of the invention may find utility.

Embodiments of the invention enable a device with a simplified user input interface to perform functions not accessible through the user interface of the device. FIG. 4 illustrates an example system in which embodiments of the invention may find utility.

In the example scenario of FIG. 4, client 101b has obtained a health monitor 401. Health monitor 401 may be, for example, a heart rate monitor, blood pressure monitor, blood glucose monitor, or another kind of monitoring device. Health monitor 401 includes a local wireless communication transceiver, for example a Bluetooth® LE transceiver or another kind of local wireless interface. Health monitor 401 may be designed to operate in conjunction with a cellular telephone or other device, and to transmit its readings to the cellular telephone for relaying to a monitoring service such as remote server 402.

Typically, wireless devices using a local wireless communication capability must be "paired" or otherwise designated to communicate with each other, and not with other devices in the vicinity using the same kind of wireless capability.

The following discussion uses Bluetooth® LE as an example local wireless interface, but it is to be understood that the invention is not so limited, and may be embodied in systems using other kinds of local wireless interfaces.

Bluetooth® LE devices are typically divided into "central" and "peripheral" devices. The central device is often a smartphone, tablet computer, smart watch, or the like, while peripheral devices may typically be devices such as heart rate monitors, fitness trackers, sensors, and the like. Unpaired peripheral devices can "advertise" their presence and availability for pairing by intermittently transmitting an advertising signal. Central devices listen for these advertising signals, and can assist their users in the pairing process. The pairing process may require the user to select from a number of available peripheral devices, and to enter a pairing code into the central device to establish pairing with the selected peripheral device.

In the example of FIG. 4, communications device 103b acts as the central device. Newly-acquired health monitor 401 is a peripheral device, and is advertising its availability for pairing. Similarly, a wireless headset 403 is also in the vicinity of communications device 103b, and is also a peripheral device advertising its availability for pairing. Simplified communications device 103b can recognize both health monitor 401 and headset 403 as being present. But because simplified device 103b lacks a keyboard and display, it has no practicable way to inform client 101b of the fact that two different devices are available for pairing, to receive an indication of which device to pair with, or to receive a pairing code from client 101b. Without some other method to pair devices, client 101b may not be able to take advantage of the availability of devices such as health monitor 401. Embodiments of the invention provide an alternate method.

According to embodiments of the invention, simplified communications device 103b and computer system 106 at PRC 102 are cooperatively programmed to facilitate pairing of peripheral devices with simplified device 103b.

Figure 5:
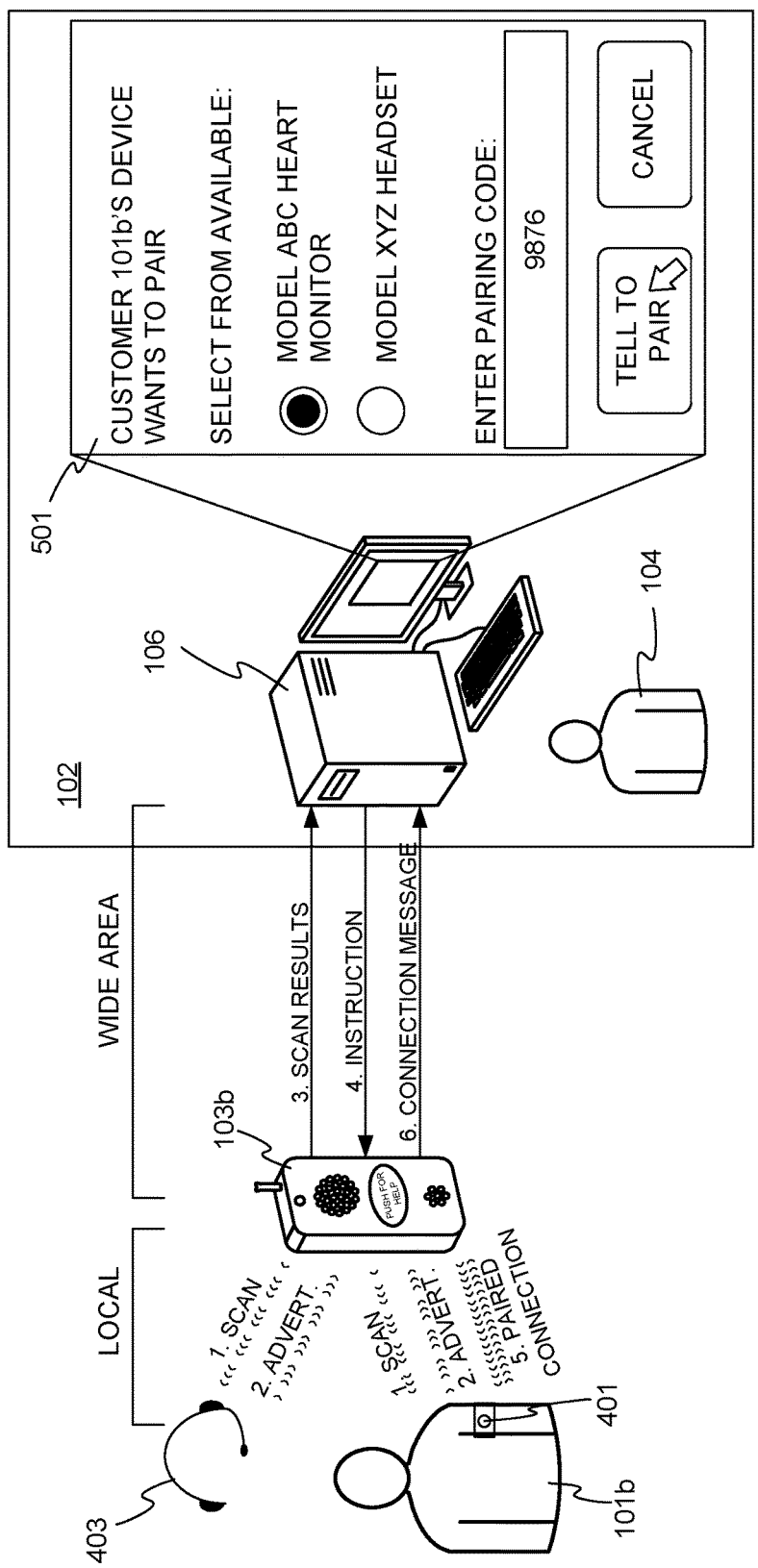
FIG. 5 illustrates a set of communications for facilitating pairing between a simplified device and a health monitor, in accordance with embodiments of the invention.

FIG. 5 illustrates a set of communications for facilitating pairing between simplified device 103b and health monitor 401. In the communications labeled "1" in FIG. 5, simplified device 103b scans for the presence of nearby peripheral devices. In the communications labeled "2", the peripheral devices advertise their presence and availability for pairing. In this example, there are two peripheral devices—health monitor 401 and headset 403. These communications occur using the local wireless transceiver of simplified device 103b.

Simplified device 103b collects the information from the advertised peripheral devices, but does not have a screen or other practicable way to get instructions from client 101b about how to proceed, for example which of the available devices the client would like to be paired with device 103b.

At "3" in FIG. 5, simplified device 103b sends to computer system 106 at PRC 102 a list of the peripheral devices it recognized as being present and available for pairing. Simplified device 103b may also send details about the services made available by the devices found during scanning. This communication occurs using the wide area transceiver of device 103b. In some embodiments, the wide area transceiver is a cellular telephone transceiver, and communication "3" involves cellular telephone and other infrastructure. In other embodiments, communication "3" may be a voice-over-internet-protocol (VOIP) call, a wireline call, an Internet connection, or another kind of communication capable of reaching PRC 102, which may be at any location. The terms "wide area communications transceiver" and "wide area communications link" are intended to encompass all of these and similar possibilities.

Communications via the wide area communications transceiver may be in any suitable format. For example communications may be sent a short message service (SMS) messages or text messages, may be in the form of data calls, may be in the form of dual tone multiple frequency (DTMF) tones sent over a telephone voice channel, or may be in another form. In some embodiments, customer service representative 104 and client 101b may carry on a conversation during the process during the process depicted in FIG. 5. For example, customer service representative 104 may provide guidance in unpacking and powering up health monitor 401, in installing batteries in health monitor 401, or other guidance.

Once the list of recognized peripheral devices reaches computer system 106, the list may be presented on a screen to customer service representative 104. Customer service representative 104 can select the proper peripheral device, for example using a graphical user interface such as example graphical user interface 501. In one scenario, client 101b may have obtained health monitor 401 from PRC 102, with instructions to simply turn it on and place it near simplified device 103b, and then call PRC 102 for setup assistance. Client 101b can simply tell customer service representative 104 that he or she recently bought health monitor 401 and is calling to have it set up. Thus, customer service representative 104 knows which device should be paired, and may be able to look up the pairing code from the records of client 101b stored on computer system 106. In other situations, customer service representative 104 may learn which device is to be paired with by other methods. For example, a unique identifier of a peripheral device may include information from which customer service representative 104 can determine the manufacturer of the peripheral device. Headset 403 may be from a different manufacturer than health monitor 401, and customer service representative 104 can readily exclude headset 403 from consideration based on the manufacturer information. In some embodiments, only one peripheral device may be present, and customer service representative 104 can select that device by default.

Once it is determined which peripheral device is to be paired with simplified device 103b, customer service representative 104 simply makes the indication on user interface 501, and may also enter a pairing code if necessary. Simplified device 103b may also send a list of supported features such as blood pressure data, heart rate data, blood sugar data, location, and time. CSR 104 may have the option to select which data to enable, based on customer preference, service levels, medical need, or other criteria. Computer system 106 sends an instruction (at "4") to simplified device 103b to pair with health monitor 401. Simplified device 103b receives the instruction via its wide area communications transceiver, and establishes a paired connection (at "5") via the local wireless communications transceiver with health monitor 401. Simplified device 103b may then inform PRC 102, via the wide area communications transceiver, that pairing was successful.

Health monitor 401 can then send data through simplified device 103b to a remote site for collection, storage, analysis, monitoring or other purposes. For example, health monitor 401 may send data to remote server 402 shown in FIG. 4, to computer system 106, or to another location. Data may be sent to multiple locations if desired. For example, the data from health monitor 401 may be made available to family members of client 101b via direct communications, by being posted on a website, or by other methods.

While the above example describes pairing with health monitor 401 for remote monitoring, embodiments of the invention may find utility in many other situations. For example, the principles of the invention may be used to couple a device to any of a wide variety of sensors, including health sensors such as blood sugar, heart rate, blood pressure, or other kinds of sensors such as fall detectors, door sensors, pill box monitors, wireless headsets, accelerometers, motion sensors, Hall effect sensors, scales, or any other workable kind of sensor. A device such as simplified device 103b may be paired with or otherwise establish communications with multiple peripheral devices.

And while the examples above are given in the context of simplified device 103b, embodiments of the invention may be used with other more capable devices as well, for example smart phones, flip phones, tablet computers, electronic reading devices, portable or non-portable computer systems, dedicated hubs, or other kinds of devices. While the assisted setup may be especially helpful to the user of a simplified device such as device 103b that lacks a keyboard or display, the user of a more capable device may be unfamiliar with the steps required for pairing, or may simply wish to have the setup process handled by someone else. Embodiments of the invention may be used in a technical support setting, for example by a corporate information technology department.

Figure 6:
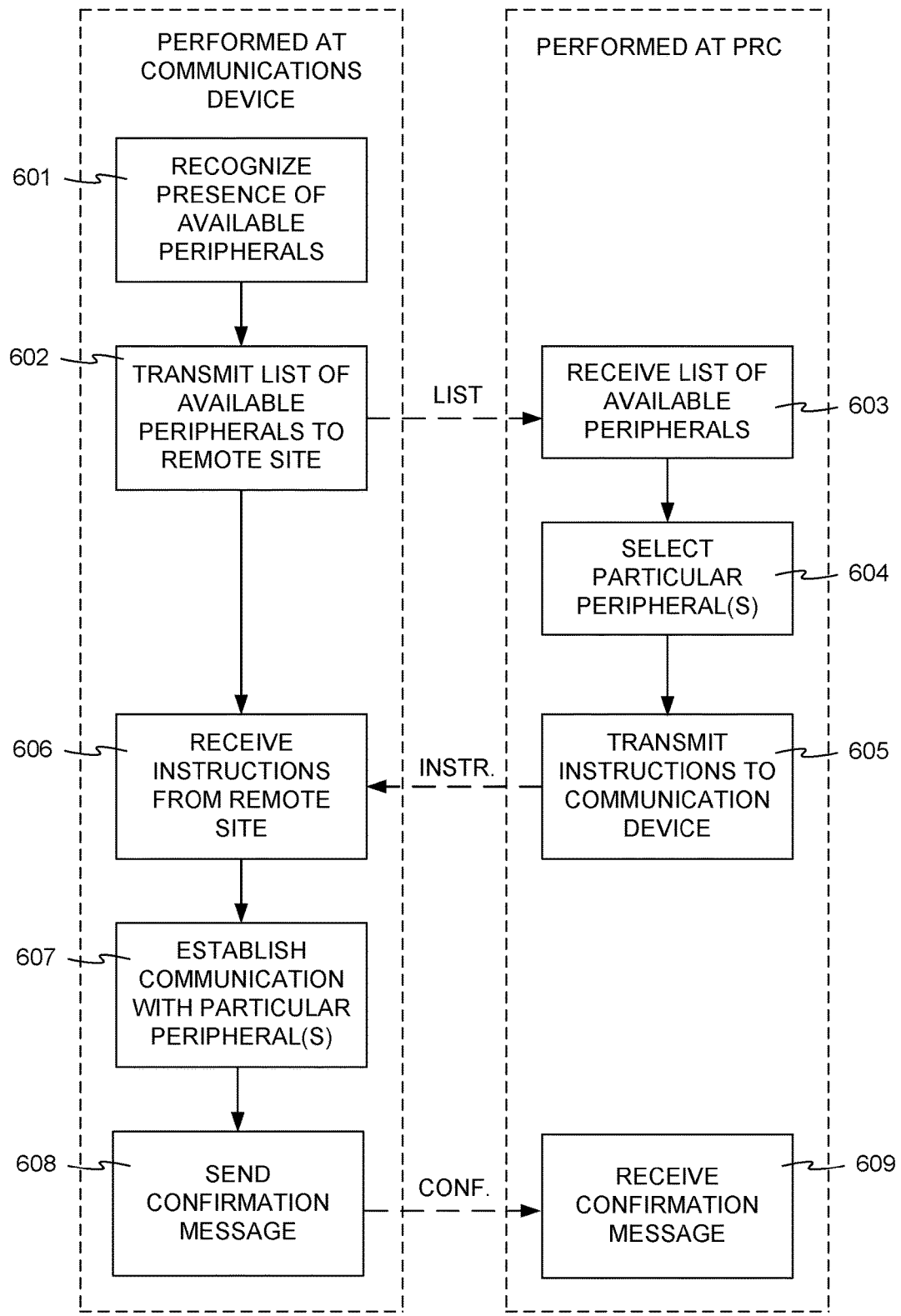
FIG. 6 illustrates steps performed by a communications device and steps performed at a remote site in configuring the communication device for pairing with a peripheral device, in accordance with embodiments of the invention.

FIG. 6 illustrates steps performed by a communications device such as device 103b and steps performed at a remote site such as PRC 102 in configuring the device for pairing with a peripheral device, in accordance with embodiments of the invention. The communications device and systems at the remote site may be cooperatively programmed to perform the steps of FIG. 6.

At step 601, the communications device recognizes the presence of one or more peripheral wireless devices available for transferring data to the communications device. For example, this may involve scanning via a local wireless communications transceiver and receiving advertising signals from peripheral devices available for pairing with the communications device.

At step 602, the communications device transmits a list of the recognized peripheral devices to a remote site. For example, this step may involve transmitting the list to a response center such as PRC 102 or another site, via a wide area communications link such as a cellular telephone connection. The list may be transmitted in an SMS message, in a data call, or in another suitable format.

At step 603, the remote site receives the list of recognized peripheral devices and/or supported features from the communications device, for example via the wide area communications link.

At step 604, a particular one of the peripheral devices is selected. The selection may be performed automatically or with human assistance, for example from customer service representative 104. In the case of automatic selection, computer system 106 may automatically select the device to which simplified device 103b is to be paired based on a customer's device history, personal profile, pre-configured settings, the device type, or other criteria.

More than one particular peripheral device may be selected. In some cases, all of the recognized peripheral devices may be selected, and in other cases, fewer than all of the recognized peripheral devices may be selected. In addition, device 103b or PRC 102 may blacklist some peripheral devices that have historically been shown to be not applicable, thus reducing time and power requirements.

At step 605, the remote site transmits an instruction to the communications device, to establish communication with the particular peripheral device or devices. For example, the instruction may be transmitted via the wide area communications link, such as a cellular telephone connection. The instruction may be in any suitable format, for example and SMS message, a data call, or other format. In some embodiments, the instruction may include one or more codes such as pairing codes, or additional data required to make the connection.

At step 606, the communications device receives the instruction from the remote site. At step 607, the communications device establishes communication with the particular peripheral device or devices. For example, when the local wireless communications transceiver of the communications device is a Bluetooth® transceiver, establishing communications may involve pairing with the peripheral device. A pairing code may be required, and may be received from the remote site with the instructions received from the remote site.

At step 608, the communications device may send a confirmation message to the remote site, confirming that communication has been established with the particular peripheral device in accordance with the instructions. At step 609, the remote site receives the confirmation message. For example, the communications device may send an SMS message or make a data call to PRC 102, indicating that the communications device has successfully paired with the peripheral device.

After communications are established, the device may receive ongoing monitoring data from the paired peripheral device or devices and forward it to PRC 102 or another remote location for monitoring, storage, or other uses. For example, data from health monitor 401 may be forwarded to a medical monitoring service.

Figure 7A:
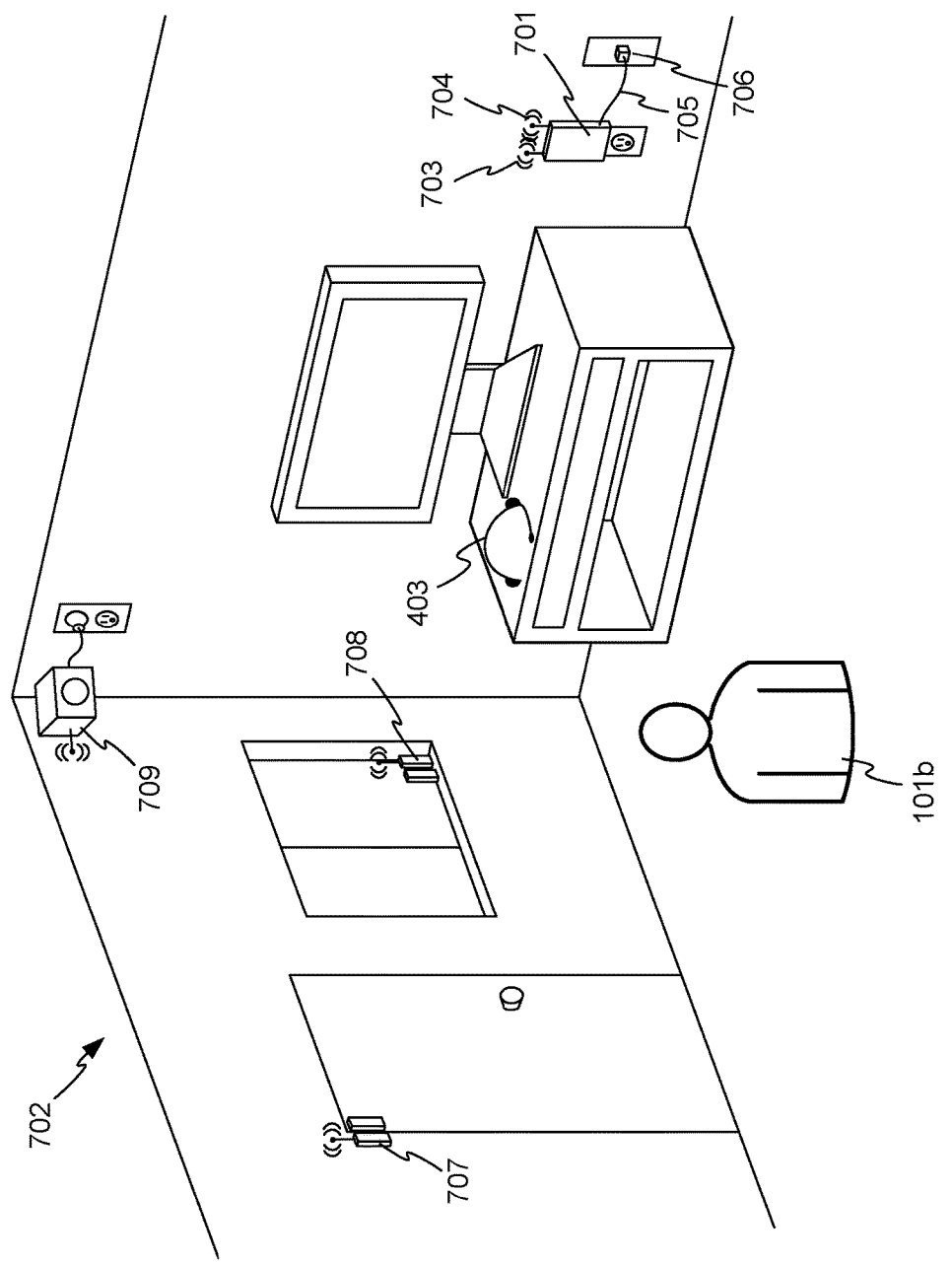
FIGS. 7A and 7B illustrate a system in accordance with other embodiments of the invention.
Figure 7B:
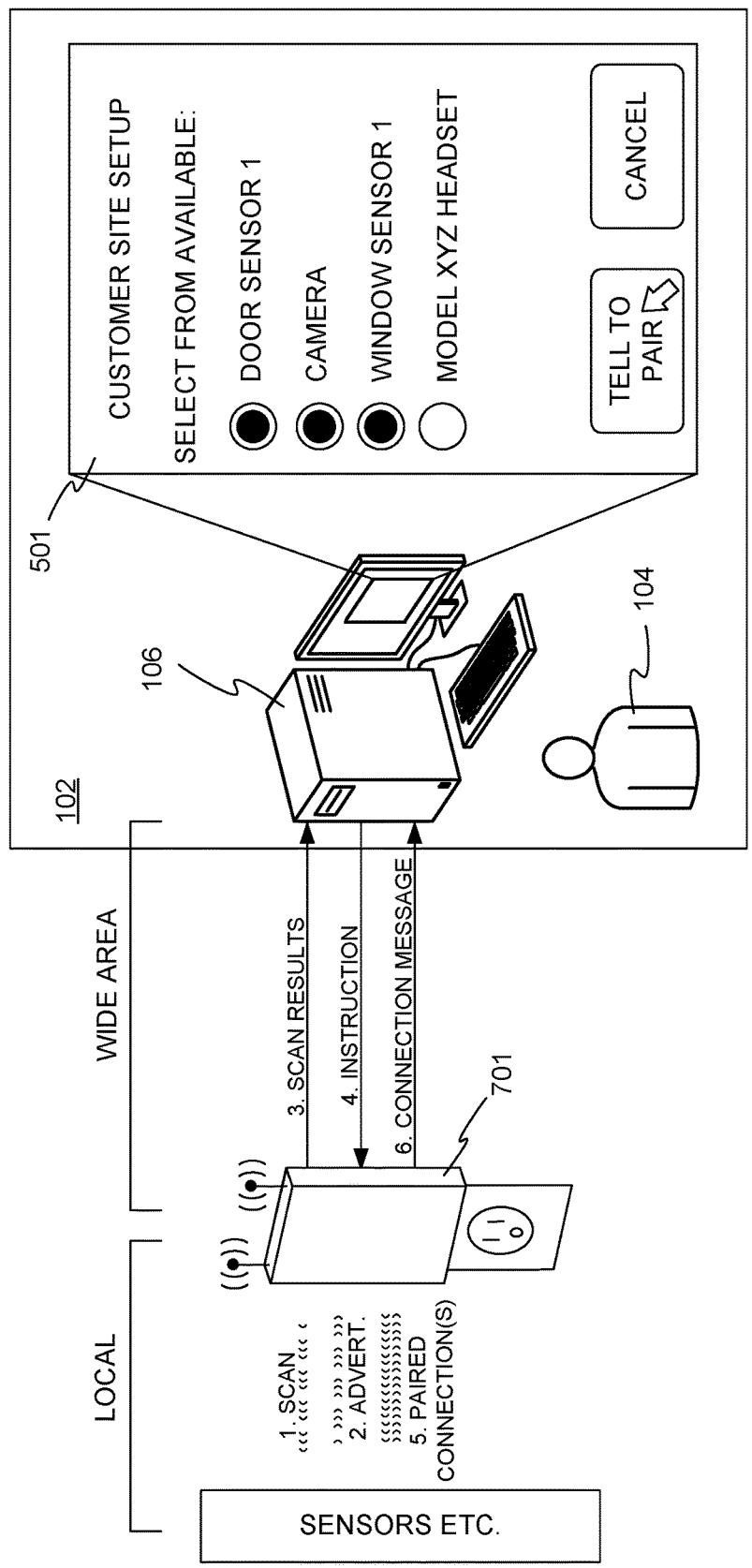

FIGS. 7A and 7B illustrate a system in accordance with other embodiments of the invention. The embodiment of FIGS. 7A and 7B differs from the embodiments described above in that the embodiment of FIGS. 7A and 7B is in the context of home security and monitoring, rather than medical personal emergency response. As shown in FIG. 7A, a communications device in the form of a dedicated hub 701 is installed in a home 702. Hub 701 has at least a local wireless communications transceiver, symbolized by antenna 703. The local wireless communications transceiver may be of any suitable type, and may be for example a Bluetooth®, ZigBee®, NFC™, Wi-Fi™, ANT™, Z-Wave®, or another suitable kind of transceiver. Multiple kinds of local wireless communications transceivers may be present and usable simultaneously.

Hub 701 also has a wide area communications transceiver, which may also be wireless as symbolized by antenna 704. For example, hub 701 may include a cellular telephone transceiver. Alternatively, hub 701 may be connected to a wired network, symbolized by cable 705 plugged into network connection 706. Network connection 706 may be to a telephone network, a cable television network, an Ethernet or other Internet connection, or any other suitable kind of network connection. If desired, hub 701 may have both wireless and wired wide area communications capabilities, used in the alternative or together. In other embodiments, hub 701 may include an IEEE 802.11 "Wi-Fi™" transceiver that communicates with an Internet access point to provide wide area communications. Hub 701 may have such items as a display, a power switch, a power indicator light, a keypad, or other controls and indicators, or hub 701 may lack any user interface.

Also present in home 702 are various kinds of sensors, including a door sensor 707, a window sensor 708, and a security camera 709. While only three sensors or other home security devices are shown, it will be recognized that any workable number of devices may be present, in any workable combination of types. Each of the sensors includes a local wireless communications transceiver capable of communicating with the local wireless communications transceiver of hub 701. Other devices may be present as well, for example wireless headset 403. Some of the sensors and other devices may be battery powered, and some may require connection to the mains power supply. Some of the sensors and other devices may provide the option of being battery powered or being connected to the mains.

Embodiments of the invention enable setup of a security system including sensors such as sensors 707, 708, and 709 with little involvement from the homeowner beyond installing the devices and plugging in those that require a mains connection.

For example, a homeowner (or other person) such as client 101*b* may subscribe to a home monitoring service provided by a remote site such as private response center (PRC) 102. The security system provider may ship a collection of sensors to home 702 with instructions for their physical installation. For example, the instructions may direct client 101*b* to plug hub 701 into a mains outlet near the center of home 702, and to turn it on if it includes a power switch. Client 101*b* may then install door and window sensors 707 and 708 with a movable part attached to the respective door or window, and a fixed part on the window or door frame. Window and door sensors and the like may come with pre-installed batteries, or client 101*b* may install batteries or connect the sensors to mains power. Similarly, client 101*b* would place camera 709 such that it has a view of an area where photo or video monitoring is desired.

Client 101*b* may then contact the security service provider (PRC 102 in this example) for assistance with the rest of the setup of the system, including establishing communication (for example via pairing) between the various sensors and hub 701. For example, client 101*b* may contact PRC 102 by telephone, email, a website or other means. In some embodiments, hub 701 may include a telephone- or network-based intercom-like capability for contacting PRC 102.

The communications setup is illustrated schematically in FIG. 7B. In the communication labeled "1" in FIG. 7B, hub 701 scans for the presence of sensors or other devices available for pairing or other communications. The various sensors 707-709 advertise their presence and availability for pairing or other communication in the communication(s) labeled "2" in FIG. 7B. Hub (communications device) 701 recognizes the sensors, and in communication "3" sends a list of the available devices to PRC 102 via its wide area communications capability. Customer service representative 104 at PRC 102 views the available devices and selects those for pairing with hub 701.

As is shown in FIG. 7B, other devices that are not part of the system being installed may have been recognized by hub 701, for example headset 403 coincidentally present near hub 701. Customer service representative 403 may recognize that headset 403 is not part of the security system being installed, and may exclude it from the list of devices with which hub 701 should pair. In other embodiments, a system may include many different kinds of sensors, such as security sensors, health monitors, fall detectors, or other kinds of sensors. For the purposes of the embodiment of FIGS. 7A and 7B, headset 403 serves as an example of a device that may be excluded or "filtered" from the device connection list.

In the communication labeled "4" in FIG. 7B, the filtered list of devices is sent back to hub 701, which can then establish paired connections "5" with the devices. Hub 701 then preferably reports at "6" that the connections are established. If one or more of the devices fails to pair with hub 701, hub 701 can report that fact as well. Customer service representative 104 may then work with client 101*b* to resolve any issues, such as incorrect power connections, failure to install batteries, or the like.

Once the pairing is complete, data from the various sensors can be sent via hub 701 to a remote monitoring site such as PRC 102, remote site 402, or another remote site. For example, the provider of a security monitoring service may be notified by window sensor 708 if its associated window is opened, and can contact client 101*b* for verification that all is well. In other cases, the security monitoring service may notify the authorities of a possible break-in. In some embodiments, hub 701 may include a keypad to enable client 101*b* to enter an "all clear" code before or after information suggesting a break-in is transmitted to the monitoring service.

While the above example is directed to a user-installed security system, this is not a requirement. Embodiments of the invention may be used with professional installation as well. In either case, embodiments of the invention may simplify the installation of a system for the on-site installer, while enlisting remote help for the configuration communications between the devices in the system.

While the principles of the disclosure have been described above in connection with specific apparatuses and methods, it is to be clearly understood that this description is made only by way of example and not as limitation on the scope of the disclosure. In addition, it is to be understood that all workable combinations of the features and elements disclosed herein are also considered to be disclosed.

What is claimed is:

1. A communications device, comprising:
   a wide area communications transceiver;
   a local wireless communications transceiver;
   a processor; and
   memory holding data and instructions, wherein the instructions, when executed by the processor, cause the communications device to:
   recognize, via the local wireless communications transceiver, the presence of one or more peripheral wireless devices available for transferring data to the communications device;
   transmit, to a remote site via the wide area communications transceiver, a list of the one or more recognized peripheral devices;
   receive, from the remote site via the wide area communications transceiver, an instruction to establish communications with a particular one of the one or more recognized peripheral devices;
   establish communications with the particular recognized peripheral device in response to the received instruction;
   receive from a user of the communications device an indication that a voice telephone call is to be placed via the wide area communications transceiver to an entity associated with the remote site, the indication being the actuation of a single control of the communications device; and
   placing the voice telephone call.

2. The communications device of claim 1, wherein the communications device pairs with the particular recognized peripheral device in response to the received instruction.

3. The communications device of claim 1, wherein the wide area communications transceiver is a cellular telephone transceiver.

4. The communications device of claim 1, wherein the local wireless communications transceiver is a Bluetooth® transceiver.

5. The communications device of claim 1, wherein the list of the one or more recognized peripheral devices is transmitted to the remote site via a short message service (SMS) message.

6. The communications device of claim 1, wherein the list of the one or more recognized peripheral devices is transmitted to the remote site via a data call.

7. The communications device of claim 1, wherein the communications device has a simplified user interface.

8. The communications device of claim 1, wherein the communications device lacks a graphical display screen.

9. The communications device of claim 1, wherein the instructions, when executed by the processor, cause the communications device to report, to the remote site via the wide area communications transceiver, that communications with the particular recognized peripheral device have been established.

10. The communications device of claim 1, wherein the instruction to establish communications with a particular one of the one or more recognized peripheral devices includes a code, and wherein the communications device transmits the code to the particular one of the one or more recognized peripheral devices.

11. The communications device of claim 1, wherein the instructions, when executed by the processor, further cause the communications device to receive ongoing data from the one or more recognized peripheral devices and to forward the received data to a remote site.

12. A method of configuring a communications device, the method comprising:
   recognizing, by the communications device via a local wireless communications transceiver, the presence of one or more peripheral wireless devices available for transferring data to the communications device;
   transmitting, to a remote site via a wide area communications link, a list of the one or more recognized peripheral devices;
   receiving, from the remote site via the wide area communications link, an instruction to establish communications with a particular one of the one or more recognized peripheral devices;
   establishing communications with the particular recognized peripheral device in response to the received instruction;
   receiving, from a user of the communications device, an indication that a voice telephone call is to be placed via the wide area communications transceiver to an entity associated with the remote site, the indication being the actuation of a single control of the communications device; and
   placing the voice telephone call.

13. The method of claim 12, further comprising:
   receiving, at the remote site, the list of the one or more recognized peripheral devices;
   selecting the particular one of the one or more recognized peripheral devices; and
   transmitting, to the communications device via the wide area communications link, the instruction to establish communications with the particular one of the one or more recognized peripheral devices.

14. The method of claim 13, wherein the selection of the particular one of the one or more recognized peripheral devices is performed automatically.

15. The method of claim 13, wherein the selection of the particular one of the one or more recognized peripheral devices is performed with human assistance.

16. The method of claim 13, wherein transmitting the instruction to establish communications with the particular one of the one or more recognized peripheral devices comprises transmitting a code to the communications device, and the method further comprises:

receiving, by the communications device via the wide are communications link, the code; and transmitting the code by the communications device to the particular one of the one or more recognized peripheral devices via the local wireless communications transceiver as part of the process of establishing communications with the particular peripheral device.

17. The method of claim 12, further comprising:

reporting, to the remote site via the wide area communications link, that communications with the particular one of the one or more recognized peripheral devices have been established via the local wireless communications transceiver.

18. A method of operating a call center, the method comprising:

receiving, from a communications device by a computer system at the call center via a wide area communications link, a list of the one or more peripheral devices recognized by the communications device as being available for establishing communications with the communications device;

selecting a particular one of the one or more recognized peripheral devices;

transmitting, to the communications device via the wide area communications link, an instruction to establish communications with the particular one of the one or more recognized peripheral devices;

receiving a voice telephone call from the communications device via the wide area communications link; and providing health information or navigation assistance to a user of the communications device via the voice telephone call.

19. The method of claim 18, further comprising receiving, from the communications device by the computer system at the call center via a wide area communications link, confirmation that the communications device has established communication with the particular one of the one or more recognized peripheral devices.

20. The communications device of claim 1, wherein the instructions, when executed by the processor, cause the communications device to receive, from the remote site via the wide area communications transceiver, a pairing code for use to establish communications with the particular recognized peripheral device.

21. The method of claim 18, wherein the selection of the particular one of the one or more recognized peripheral devices is made based at least in part on one or more criteria selected from the group consisting of a device history of the communications device, a personal profile of a user associated with the communications device, a type of the communications device, and pre-configured settings.

* * * * *